United States Patent [19]

Roos

[11] 3,974,013
[45] Aug. 10, 1976

[54] METHOD FOR INSULATING TUBING

[75] Inventor: Erling Roos, Upplands Vasby, Sweden

[73] Assignee: Granges Essen Aktiebolag, Vasteras, Sweden

[22] Filed: Feb. 21, 1975

[21] Appl. No.: 551,847

[30] Foreign Application Priority Data
Feb. 25, 1974 Sweden .......................... 74.024860

[52] U.S. Cl. ............................... 156/165; 29/446; 29/469; 156/187; 156/191; 156/271
[51] Int. Cl.² ........................................ B65H 81/02
[58] Field of Search ............ 156/187, 191, 83, 197, 156/171, 172, 143, 144, 254, 253, 271, 165, 275, 250; 138/149, 114, 147; 29/455, 469, 446

[56] References Cited
UNITED STATES PATENTS
3,000,433  9/1961  Kemper ............................ 138/149
3,240,643  3/1966  Schroeder et al. .................. 156/191
3,614,967  10/1971  Royston ............................ 138/149
3,684,602  8/1972  Ball .................................... 156/149
3,817,804  6/1974  Helmick et al. .................... 156/144

*Primary Examiner*—Douglas J. Drummond
*Assistant Examiner*—Michael W. Ball
*Attorney, Agent, or Firm*—Haseltine, Lake & Waters

[57] ABSTRACT

A method of insulating tubing comprising the steps of providing the tubing with a jacket of insulating material in web form, fixing the jacket with regard to its described diametrical dimensions, e.g. with a fixing casing, enclosing the jacketed tubing in a continuous tubular outer casing, e.g. by applying relative movement in the longitudinal direction thereof, and subsequently breaking the fixed state of the jacket, thereby to enable the latter to conform in shape to the inner wall of the outer casing.

3 Claims, 3 Drawing Figures

METHOD FOR INSULATING TUBING

The present invention relates to a method of insulating tubing. It is previously known to insulate tubing by wrapping therearound webs of heat insulating material such as mineral wool. These webs were applied to the tubing either by being wound helically around said tubing or by laying said insulating material longitudinally therealong. Subsequent to being arranged on the tubing, the insulating material is fixed in position there, by means of strips of a suitable material, said strips being wound around the insulating material.

Different methods are known for providing the finished product with an outer layer or sheath which prevents the insulating material from absorbing moisture from the surroundings. In the case of tubing used in buildings for example, the outer surface of the tubing is either painted or impregnated for example. When a more effective protection against the penetration of moisture has been required, the tube together with the insulating material has been sprayed with a plastic material, thereby to provide an outer plastics casing of desired thickness, shape and strength.

As a result of manufacturing difficulties encountered therewith, the task of coating tubing with a plastics material by the extrusion of an outer layer therearound is restricted in practice.

The object of the present invention is to make possible, both practically and economically, the manufacture of insulated tubing with an outer, sealing layer of desired shape and dimension, which is able to absorb loads occurring on the tubing, such as when the tubing is placed underground and subjected to earth pressure.

In accordance herewith the invention is mainly characterized by providing the tubing with a jacket of insulating material in web form, fixing the jacket with regard to its diametrical dimensions, enclosing the jacketed tubing in a continuous tubular outer casing by relative movement between the tubing and the outer casing in the longitudinal direction thereof, and by subsequently hereto breaking the fixed state of the jacket, thereby to enable the jacket to conform in shape to the inner wall of the outer casing.

The invention will now be described in more detail with reference to an embodiment thereof schematically shown in the accompanying drawing, further features being disclosed in conjunction therewith.

Figure 1:
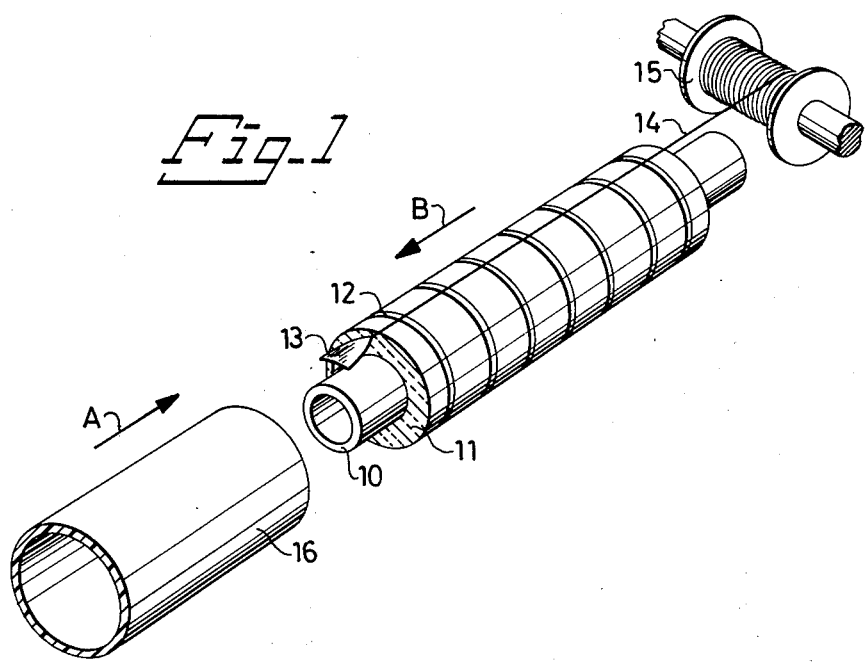
FIG. 1 is a schematic, two-part showing in perspective of a tube having an insulating jacket therearound, and a casing.

FIG. 1 has two portions, showing a tube 10 for conducting a heat-carrying fluid, a heat-insulating jacket 11, a knife means 13 to be described later in more detail, a line or wire 14 preferably dispensed from a reel 15, and in the other portion of the Figure a tubular protective casing 16. The tube 10 with the insulating jacket 11 mounted thereon is shown in a position of readiness for enclosure in the separately shown protective casing 16 of moisture-repelling and load-absorbing material. FIG. 1 also shows an exemplary embodiment of the device 13,14 according to the invention for breaking the fixed state of the insulating jacket 11 when the jacketed tube 10 is located within the protective casing 16.

Figure 2:
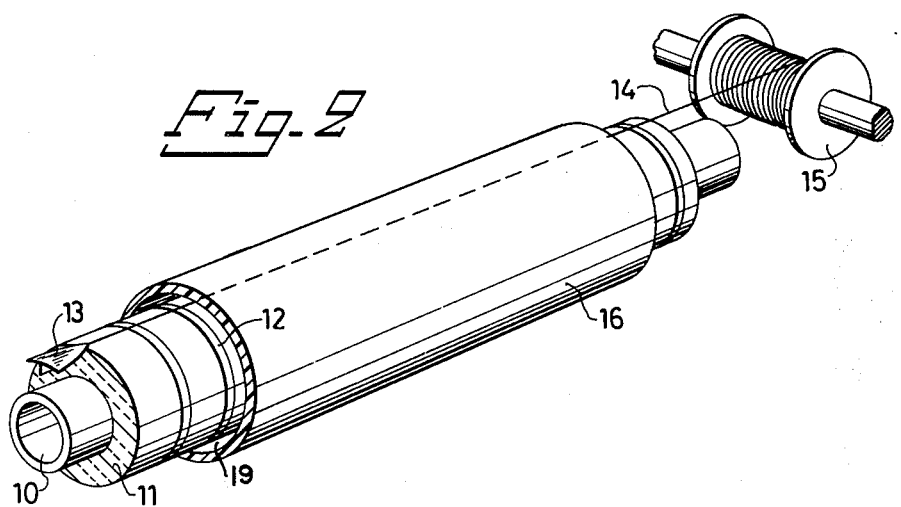
FIG. 2 shows the elements of FIG. 1 in a similar perspective view subsequent to having enclosed the jacketed tube in the protective casing.

FIG. 2 shows the elements of FIG. 1 subsequent to the enclosure of the jacketed tube 10, 11 in the protective casing 16, and FIG. 3 will be explained later on in respect of the knife means 13, for breaking the fixed state of the jacket.

In FIGS. 1 and 2 the diameter of the tube is optional and may, in practice, have a considerable length, for example a length of 25 meters, for use in so-called remote-heating systems which are placed beneath the surface of the ground.

In the right-hand portion of FIG. 1 the tube 10 is shown encased in the jacket 11, the desired shape and diametric dimensions of the jacket being fixed by means of a cord or strip material 12 wound therearound. The method of mounting the jacket and the fixing device used are not restrictive of the invention and consequently different methods may be used for this purpose within the scope of the invention.

In the left-hand portion of FIG. 1 there is shown the tubular casing 16 which is intended to be positioned around the tube 10, insulated with the jacket 11 by relative displacement in the direction of the arrow A and/or B.

When the jacket fixing means has the form of the cords or strips 12 wound therearound, as indicated in FIGS. 1 and 2, the device for breaking the fixed state of the jacket 11 may have the form of the knife means 13 for cutting the cords or strips 12, the knife means being shown in FIGS. 1 and 2 inserted in the end of the jacket 11 adjacent the protective casing 16. The knife means 13 is attached to the line 14 which, with the embodiment shown in FIG. 1, has been placed along the jacket 11 prior to encasing the insulated tube and jacket 10, 11 in the protective casing 16, and the end of which line remote from the knife means 13 is wound onto the reel 15.

Although the invention includes the alternative whereby the jacket 11 can be loosely fixed on the tube 10, it is preferred that the jacket is shaped under radial compression so that the diameter of the jacket 11 in relation to the inner diameter of the protective casing 16 is such as to enable the jacketed tube to be readily received in the casing 16.

FIG. 2 shows in perspective the elements 10, 11 located within the protective casing 16, also showing a gap 19 located between the inner wall of the protective casing 16 and the compressed jacket 11. With the illustrated embodiment, the jacket is shown in its fixed state with regard to its shape, the intention being to break the fixed state of the jacket in the relative position of the elements, by cutting the cord or strip 12, using suitable auxiliary devices.

With the jacketed tubing and casing occupying the relative positions shown in FIG. 2, the fixed state of the jacket 11 is broken by winding the line 14 onto the reel 15 so as to cause the knife means to move in the longitudinal direction of the jacket 11 while cutting successive turns of the cord or strip 12. As the cord or strip 12 is cut, successive portions of the jacket 11 are released from the compressive forces and they expand, whereupon said jacket portions independently engage the inner wall of the protective housing and center the tube 10 therein.

Figure 3:
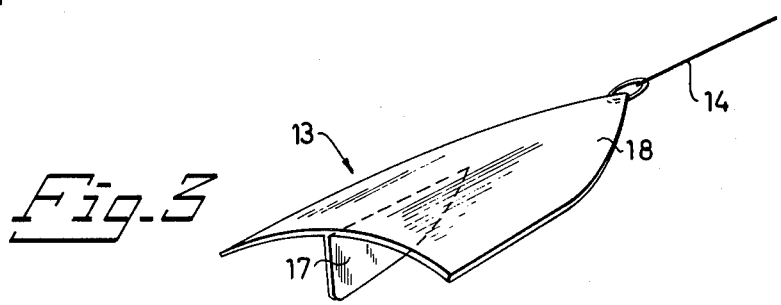
FIG. 3 is an enlarged, perspective view of a device for breaking the fixed state of the jacket.

In FIG. 3 there is shown in larger scale and in more detail the knife means 13 in accordance with the invention, said knife means comprising a knife flange 17 attached, as seen, to the lower portion of an arcuately curved guide plate 18, the radius of curvature of which is suitably approximately equal to the inner radius of curvature of the protective casing 16, so as to effectively guide the knife flange 17 during movement of the knife means 13 in the jacket 11 towards and through the turns of the cord or strip 12.

The invention is not restricted to the illustrated and described embodiment thereof but can be modified within the scope of the invention. Although mechanical cutting means are generally preferred, other, relatively equivalent means for breaking the fixed state of the jacket 11 within the protective casing 16 can be used within the scope of the invention.

An example of such means is an electric resistance wire, similar to the wire 14 of FIGS. 1 and 2, but placed between the insulating material 11 and the cord or strip 12. The fixed state of the jacket 11 is then broken by burning the turns of the cord or strip 12 by means of the resistance wire, the two ends of which can be connected in a known manner to an external electrical source (not shown).

Although the invention has been described with reference to a single tube encased in a protective casing, it also includes the enclosure of a plurality of separate tubes provided with separate insulating jackets in a common protective casing. The term tubing or tube as used here is meant to include one or more tubes enclosed within the same protective casing.

I claim:
1. A method of insulating tubing, comprising the steps of providing a tubing with a jacket of insulating material in web form; fixing the jacket with regard to its diametrical dimensions by means of a fixing casing, said fixing step is accomplished by means of a cord or strip-like material, by winding the latter around the jacket; further comprising the steps of compressing the jacket onto the tube; and cutting the cord or strip-like material externally of the tube, subsequent to said enclosing step without cutting said tubing or said outer casing; enclosing the jacketed and enclosed tubing in a continuous tubular outer casing, by applying relative movement between the tubing and the outer casing in the longitudinal direction thereof; and subsequently cutting the fixing casing longitudinally thereof, thereby breaking the fixed state of the jacket, thus conforming the latter in shape to the inner wall of the outer casing.

2. The method as defined in claim 1, wherein said step of cutting cord- or strip-like material is performed with knife means, by moving the same with a line and the like inside and longitudinally of the outer casing, also for the cutting of the fixing casing.

3. The method as defined in claim 1, wherein said step of cutting the cord- or strip-like material is performed with an electric resistance wire, by passing an electric current therethrough, thus heating the wire, also for the cutting of the fixing casing by burning the same.

* * * * *